United States Patent
Kamada (10) Patent No.: US 12,466,923 B2
(45) Date of Patent: Nov. 11, 2025

(54) RUBBER COMPOSITION MANUFACTURING METHOD AND TIRE MANUFACTURING METHOD

(71) Applicant: Toyo Tire Corporation, Itami (JP)

(72) Inventor: Shinsaku Kamada, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 979 days.

(21) Appl. No.: 17/536,633

(22) Filed: Nov. 29, 2021

(65) Prior Publication Data

US 2022/0195130 A1   Jun. 23, 2022

(30) Foreign Application Priority Data

Dec. 21, 2020   (JP) .................. 2020-211132

(51) Int. Cl.
| | |
|---|---|
| C08L 9/06 | (2006.01) |
| B29B 7/18 | (2006.01) |
| B29B 7/48 | (2006.01) |
| B60C 1/00 | (2006.01) |
| C08J 3/20 | (2006.01) |
| C08K 3/04 | (2006.01) |

(Continued)

(52) U.S. Cl.
CPC .............. *C08J 3/203* (2013.01); *B29B 7/183* (2013.01); *B29B 7/48* (2013.01); *B60C 1/0016* (2013.01); *C08K 3/04* (2013.01); *C08K 3/36* (2013.01); *C08K 5/58* (2013.01); *C08L 9/06* (2013.01); *C08L 2203/30* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 1,200,070 | A | * | 10/1916 | Banbury | B29B 7/186 |
| | | | | | 366/91 |
| 2013/0018141 | A1 | * | 1/2013 | Oda | B29B 7/283 |
| | | | | | 366/100 |

FOREIGN PATENT DOCUMENTS

| | | | |
|---|---|---|---|
| JP | 2018-034472 A | | 3/2018 |
| JP | 2018203902 A | * | 12/2018 |

(Continued)

OTHER PUBLICATIONS

Office Action dated Nov. 27, 2023, issued in counterpart CN Application No. 202111485177.1, with English Translation. (14 pages).

(Continued)

*Primary Examiner* — Peter A Salamon
(74) *Attorney, Agent, or Firm* — WHDA, LLP (57) ABSTRACT

A rubber composition manufacturing method comprising an operation in which an intermeshing internal kneader is used to knead at least rubber, silica, and silane coupling agent, wherein the operation comprises a first step in which kneading which is accompanied by increase in kneading temperature is carried out during an initial phase of the operation; kneading is carried out during the first step while a ram is maintained in a state in which it is at a first position which is higher than a lowermost position within a range of movement of which the ram is capable; and during the first step, an effective volume when the ram is at the first position is 105% to 120% relative to a value of 100% for an effective volume when the ram is at the lowermost position.

15 Claims, 1 Drawing Sheet

(51) Int. Cl.
*C08K 3/36* (2006.01)
*C08K 5/58* (2006.01)

(56) References Cited

FOREIGN PATENT DOCUMENTS

JP      2020-100120 A     7/2020
JP      2020100116 A   *   7/2020

OTHER PUBLICATIONS

Office Action dated May 30, 2024, issued in counterpart CN Application No. 202111485177.1, with English translation. (12 pages).
Office Action dated Apr. 25, 2023, issued in counterpart CN Application No. 202111485177.1, with English Translation. (15 pages).

* cited by examiner

RUBBER COMPOSITION MANUFACTURING METHOD AND TIRE MANUFACTURING METHOD

TECHNICAL FIELD

The present invention relates to a rubber composition manufacturing method and a tire manufacturing method.

BACKGROUND ART

To prepare a rubber composition in which silica is dispersed, use of a tangential internal kneader or intermeshing internal kneader to carry out kneading of silica, silane coupling agent, rubber, and so forth is known. Tangential internal kneaders are designed such that the turning circles of the two rotors do not overlap, so that a shearing effect is made to act between the rotors and the casing wall face. On the other hand, intermeshing internal kneaders are designed such that the turning circles of the two rotors overlap, so that not only is a shearing effect made to act between the rotors and the casing wall face, but a shearing effect is also made to act between the rotors.

During kneading the temperature of the kneaded batch, i.e., the kneading temperature, increases due to the shearing effect, and if the temperature should become too high, because there could be occurrence, for example, of gel formation, it is necessary to carry out kneading in such fashion as to prevent the temperature from becoming too high (see, for example, Patent Reference No. 1).

Of the types of devices used to carry out kneading, because intermeshing internal kneaders are in general superior to tangential internal kneaders with regard to cooling performance, they are able to effectively suppress increase in temperature.

However, intermeshing internal kneaders are in general inferior to tangential internal kneaders with regard to enmeshment characteristics. That is, intermeshing internal kneaders are in general poor with regard to the efficiency with which they are able to cause compounding ingredients to be incorporated thereinto.

PRIOR ART REFERENCES

Patent References

Patent Reference No. 1: Japanese Patent Application Publication Kokai No. 2020-100116

SUMMARY OF INVENTION

Problem to be Solved by Invention

If with the goal of increasing the efficiency with which these are incorporated thereinto the fill factor were to be lowered, this would cause decrease in the amount of materials (i.e., compounding ingredients and rubber) that could be fed thereinto. In other words, this would cause a decrease in productivity. Or if the fill factor were not lowered, this would increase the amount of compounding ingredients and rubber that come to rest on top of the ram, and would consequently cause the efficiency with which compounding ingredients are incorporated thereinto to become poor.

It is an object of the present invention to provide a method for manufacturing a rubber composition such as will permit kneading to be carried out with a high fill factor (e.g., a fill factor substantially equivalent to that which would be employed with a tangential internal kneader) when using an intermeshing internal kneader.

Means for Solving Problem

To solve these problems, a rubber composition manufacturing method in accordance with the present invention comprises an operation in which an intermeshing internal kneader equipped with a casing, at least two rotors which are capable of rotating within the casing, a neck portion which is located above the rotors, and a ram which is capable of moving vertically in a space within the neck portion is used to knead at least rubber, silica, and silane coupling agent, wherein the operation comprises a first step in which kneading which is accompanied by increase in kneading temperature is carried out during an initial phase of the operation;

kneading is carried out during the first step while the ram is maintained in a state in which it is at a first position which is higher than a lowermost position within a range of movement of which the ram is capable; and taking a volume of space which is enclosed by the ram and the casing when the ram is at the lowermost position to be a first effective volume, and taking a volume of space which is enclosed by the ram and the casing when the ram is at the first position to be a second effective volume, the second effective volume is 105% to 120% relative to a value of 100% for the first effective volume during the first step.

In accordance with the present invention, using an intermeshing internal kneader to carry out kneading will make it possible to impart the kneaded batch with shear deformations and tensile deformations between the rotors.

Moreover, in accordance with the present invention, by, at a first step (i.e., step in which kneading which is accompanied by increase in kneading temperature is carried out) during an initial phase, causing kneading to be carried out while the ram is maintained in a state in which it is at a first position (i.e., a position which is higher than the lowermost position), because it will be possible to prevent materials (i.e., compounding ingredients and/or rubber) from coming to rest on top of the ram, it will be possible for kneading to be carried out with a high fill factor (e.g., a fill factor on substantially the same order as or higher than that which would be employed with a tangential internal kneader).

Moreover, because it is possible in accordance with the present invention to prevent materials (i.e., compounding ingredients and/or rubber) from coming to rest on top of the ram, it is possible to improve the efficiency with which compounding ingredients are incorporated thereinto. In other words, it will be possible to reduce black incorporation time (hereinafter sometimes referred to as "BIT"). As a result, because it will be possible to ensure that there will be sufficient kneading time for dispersal of silica, this will make it possible to improve dispersal of silica. It will therefore be possible to improve performance with respect to braking on wet road surfaces (hereinafter "wet braking performance") and ability to achieve reduced heat generation.

Moreover, in accordance with present invention, by causing a second effective volume (i.e., a volume of space which is enclosed by the ram and the casing when the ram is at the first position) to be not less than 105% relative to a value of 100% for a first effective volume (i.e., a volume of space which is enclosed by the ram and the casing when the ram is at the lowermost position), because it will be possible to effectively prevent materials (i.e., compounding ingredients and/or rubber) from coming to rest on top of the ram, it will be possible to further improve the efficiency with which compounding ingredients are incorporated thereinto. In other words, it will be possible to further reduce BIT.

What is more, in accordance with the present invention, by causing the second effective volume (i.e., the volume of space when the ram is at the first position) to be not greater than 120% relative to a value of 100% for the first effective volume (i.e., the volume of space when the ram is at the lowermost position), because it will be possible to effectively subject the kneaded batch to shearing, it will be possible to cause increase in kneading temperature without difficulty during the first step (i.e., step in which kneading which is accompanied by increase in kneading temperature is carried out).

It is preferred that the rubber composition manufacturing method of the present invention be constituted as follows.

It is preferred that the operation comprise a second step in which, after the first step, kneading is carried out while the kneading temperature is controlled so as to suppress occurrence of a coupling reaction between the silica and the silane coupling agent, rotational speeds of the rotors being controlled by means of PID control to cause the kneading temperature to be a target temperature at the second step;
 during the second step as well, that kneading be carried out while the ram is maintained in a state in which it is at the first position; and
 during the second step as well, that the second effective volume be 105% to 120% relative to a value of 100% for the first effective volume.

As a result of adoption of such a constitution, causing kneading to be carried out while kneading temperature is controlled so as to suppress occurrence of the coupling reaction will make it possible to achieve effective dispersal of silica before the coupling reaction reaches the point where it is proceeding vigorously. As a result, it will be possible to further improve performance with respect to braking on wet road surfaces (wet braking performance) and ability to achieve reduced heat generation.

Moreover, at the second step, causing the second effective volume (i.e., the volume of space when the ram is at the first position) to be not less than 105% relative to a value of 100% for the first effective volume (i.e., the volume of space when the ram is at the lowermost position) will facilitate maintenance of the kneading temperature. Description will be given with respect to this. If the ram were to be in its lowermost position during the second step, then because there would be much heat generated from shearing, this would tend to lead to an increase in temperature. To address this, in accordance with the present invention, because causing the second effective volume (i.e., the volume of space when the ram is at the first position) to be not less than 105% relative to a value of 100% for the first effective volume (i.e., the volume of space when the ram is at the lowermost position), i.e., causing the ram to be at a suitable position, makes it possible to avoid a situation in which the amount of heat generated from shearing becomes too large, this facilitates maintenance of the kneading temperature at the target temperature.

And not only that but also, at the second step, causing the second effective volume (i.e., the volume of space when the ram is at the first position) to be not greater than 120% relative to a value of 100% for the first effective volume (i.e., the volume of space when the ram is at the lowermost position) will make it possible to maintain the kneading temperature without difficulty. Description will be given with respect to this. If the ram were to be too high during the second step, this would cause there to be too little heat generated from shearing. To address this, in accordance with the present invention, because causing the second effective volume (i.e., the volume of space when the ram is at the first position) to be not greater than 120% relative to a value of 100% for the first effective volume (i.e., the volume of space when the ram is at the lowermost position), i.e., causing the ram to be at a suitable position, makes it possible to avoid a situation in which the amount of heat generated from shearing becomes too small, this makes it possible to maintain the kneading temperature at the target temperature without difficulty.

A tire manufacturing method in accordance with the present invention comprises an operation in which the rubber composition manufacturing method of the present invention is used to prepare the rubber composition; and an operation in which the rubber composition is used to fabricate an unvulcanized tire.

EMBODIMENTS FOR CARRYING OUT INVENTION

Figure 1:
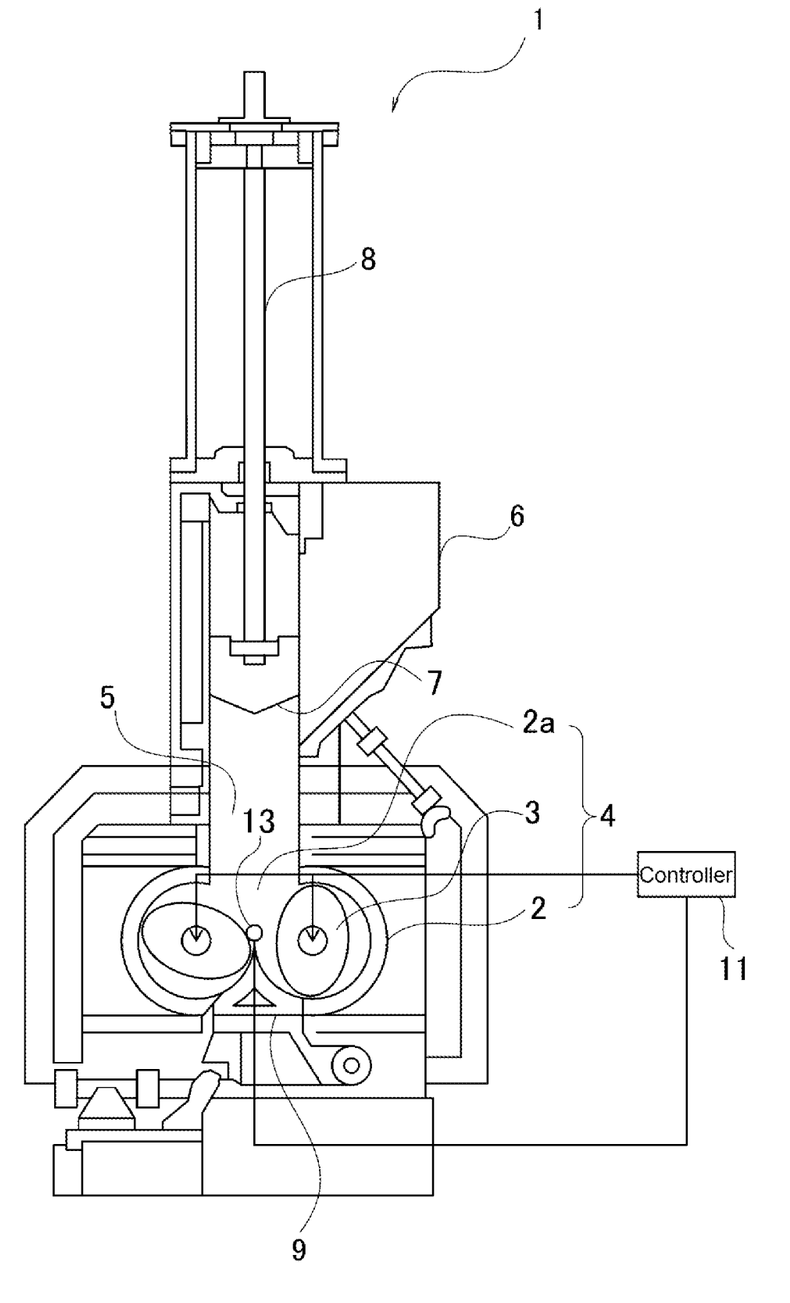
The FIGURE is a conceptual diagram showing constitution of intermeshing internal kneader capable of being used in accordance with the present embodiment.

Below, description is given with respect to embodiments of the present invention.

Throughout the present specification, at all locations employing the concept "first," "second," and so forth, note that this is done merely for the purpose of distinguishing one item from other(s), and should not be understood to indicate or suggest any relative order or technique.

1. Intermeshing Internal Kneader

Description will first be given with respect to an intermeshing internal kneader capable of being used in accordance with the present embodiment.

As shown in the FIGURE, intermeshing internal kneader 1 is equipped with casing 2; two rotors 3 which are capable of rotating within casing 2; neck portion 5 which is located above rotors 3; inlet port 6 which is provided at neck portion 5; ram 7 which is capable of moving vertically in the space within neck portion 5; and drop door 9 which is capable of blocking a discharge port provided at casing 2.

Opening portion 2a is provided in a central region at the top face of casing 2. Neck portion 5 which has the cylindrical space at the interior thereof is provided above opening portion 2a. Inlet port 6, by way of which rubber and compounding ingredients can be fed thereinto, is provided at the side face of neck portion 5. Two or more inlet ports 6 may be provided. Rubber and compounding ingredients fed thereinto from inlet port 6 pass through the cylindrical space at neck portion 5 and are fed into the interior of casing 2 by way of opening portion 2a of casing 2.

Ram 7 is of such shape as to be capable of closing off opening portion 2a of casing 2. By virtue of shaft 8 which is connected thereto at the top end thereof, ram 7 is made capable of moving vertically within the cylindrical space of neck portion 5. Under the force of its own weight and/or as a result of a pressing force that acts thereon from shaft 8, ram 7 is able to press on and compress the kneaded batch that is present within casing 2.

Drop door 9 is capable of being opened and closed. Drop door 9 is closed during kneading. That is, during kneading, drop door 9 blocks the discharge port which is provided at casing 2. Drop door 9 opens following termination of kneading.

The rotational speed of a motor (not shown) which causes rotor 3 to rotate is adjusted based on control signals from controller 11. Controller 11 carries out control of the rotational speed of the motor based on information (more specifically, measured temperature Tp) regarding the temperature within kneading chamber 4 which is sent thereto from temperature sensor 13. The motor can be made to be of variable rotational speed by virtue of controller 11. The motor might, for example, be an inverter-duty motor.

To determine the rotational speed of the motor, a PID arithmetic unit provided within controller 11 carries out proportional (P), integral (I), and differential (D) arithmetic operations based on the deviation between target temperature Ts and temperature Tp measured within kneading chamber 4 as detected by temperature sensor 13. More specifically, the PID arithmetic unit determines motor rotational speed from the sum of respective control quantities obtained as a result of proportional (P) action by which a control quantity is calculated in proportion to the difference (deviation e) between measured temperature Tp and target temperature Ts, integral (I) action by which a control quantity is calculated from an integral obtained by integrating the deviation e over time, and differential (D) action by which a control quantity is calculated from the slope of the change in, i.e., the derivative of, deviation e. Note that PID is an abbreviation for Proportional Integral Differential.

Intermeshing internal kneader 1 is designed so that the two rotors 3 mutually intermesh. In other words, it is designed so that the turning circles of the two rotors 3, or to be more precise the turning circles which are the loci of the paths taken by the outwardmost portions of the two rotors 3, overlap. Here, note that the "outwardmost portions" are the portions farthest from the rotating shafts of rotors 3. Intermeshing internal kneader 1 is therefore such that not only does a shearing effect act between the rotors 3 and the wall face of the casing 2, but a shearing effect also acts between the rotors 3. That is, not only is it possible to impart the kneaded batch with shear deformations and tensile deformations between the rotors 3 and the wall face of the casing 2, but it also possible to impart the kneaded batch with shear deformations and tensile deformations between the rotors 3.

2. Respective Rubber Composition Manufacturing Method Operations

Description will next be given with respect to some of the operations which are included in a method for manufacturing a rubber composition in accordance with the present embodiment.

A method for manufacturing a rubber composition in accordance with the present embodiment comprises an operation (hereinafter "Operation S1") in which at least rubber, silica, and silane coupling agent are kneaded in intermeshing internal kneader 1 to prepare a rubber mixture; and an operation (hereinafter "Operation S2") in which at least the rubber mixture and a vulcanizing-type compounding ingredient are kneaded to obtain a rubber composition. In accordance with the present embodiment, using intermeshing internal kneader 1 to carry out kneading at Operation S1 makes it possible to impart the kneaded batch with shear deformations and tensile deformations between the rotors 3. It is therefore possible as described below to cause kneading to be carried out while ram 7 is maintained in a state in which it is at a first position which is higher than the lowermost position within the range of movement of which ram 7 is capable (if a tangential internal kneader were used to cause kneading to be carried out while the ram is maintained in a state in which it is at a position which is higher than the lowermost position of the ram, because the kneaded batch would pile up in a region above the rotors, kneading could not readily be carried out while in such a state). In addition, this also makes it possible to effectively cool the kneaded batch.

2.1 Operation S1 (Operation in which Rubber Mixture is Prepared)

Operation S1 comprises a step (hereinafter "first step") in which kneading which is accompanied by increase in kneading temperature is carried out; a step (hereinafter "second step") in which kneading is carried out while kneading temperature is controlled so as to suppress occurrence of a coupling reaction between silica and silane coupling agent; a step (hereinafter "third step") in which kneading which is accompanied by further increase in kneading temperature is carried out; and a step (hereinafter "fourth step") in which kneading is carried out while the kneading temperature is controlled so as to cause the coupling reaction to proceed.

The first step through the fourth step constitute a single kneading stage. A kneading stage is the cycle that takes place from the time that material(s) are fed into intermeshing internal kneader 1 until the time that discharge occurs therefrom. Materials, such as rubber, silica, and silane coupling agent therefore remain undischarged from intermeshing internal kneader 1 at the time of the transition from the first step to the second step, and the materials likewise remain undischarged from internal kneader 1 at the time of the transition from the second step to the third step, as well as at the time of the transition from the third step to the fourth step.

It is preferred at Operation S1 that the fill factor be not less than 68%, and more preferred that this be not less than 70%. In accordance with the present embodiment, because as described below it will make it possible to prevent materials (i.e., compounding ingredients and/or rubber) from coming to rest on top of ram 7, kneading may be carried out with a fill factor of not less than 68%. It is preferred that the fill factor at Operation S1 be not greater than 80%, and more preferred that this be not greater than 78%. Causing this to be not greater than 80% will make it possible for the silica to be readily dispersed therein.

Fill factor may be calculated in accordance with the following formula.

$$\text{Fill factor} = (\text{rubber mixture volume}/\text{first effective volume}) \times 100$$

At this formula, rubber mixture volume is the volume of the rubber mixture that is discharged from intermeshing internal kneader 1. As described below, first effective volume refers to the volume of the space which is enclosed by ram 7 and casing 2 when ram 7 is at its lowermost position. At this formula, rubber mixture volume and first effective volume may both be expressed in liters (L).

At Operation S1, note that ram 7 may be moved up and down with any desired timing for the purpose of cleaning (e.g., to dislodge compounding ingredients and/or rubber that have come to rest on top of ram 7). For example, ram 7 may be moved up and down at the time of the transition from the first step to the second step, ram 7 may be moved up and down at the time of the transition from the second step to the third step, and/or ram 7 may be moved up and down at the time of the transition from the third step to the fourth step. Ram 7 may be moved up and down with any desired timing during any desired step (e.g., the first step).

2.1.1. First Step (Step in which Kneading Accompanied by Increase in Kneading Temperature is Carried Out)

At the first step, at least rubber, silica, and silane coupling agent are fed into intermeshing internal kneader 1, and kneading of these is carried out. Kneading carried out at the first step is accompanied by increase in kneading temperature due to the heat generated from shearing.

As the rubber, natural rubber, polyisoprene rubber, styrene-butadiene rubber (SBR), polybutadiene rubber (BR), nitrile rubber, chloroprene rubber, and so forth may be cited as examples. One or any desired combination may be chosen from thereamong and used. It is preferred that the rubber be diene rubber.

A modified rubber may be used as the rubber. As modified rubber, modified SBR and modified BR may be cited as examples. The modified rubber may possess functional group(s) that contain heteroatom(s). While functional group(s) may be introduced at end(s) of polymer chain(s) or in mid-chain, it is preferred that they be introduced at end(s) thereof. As functional group(s), amino groups, alkoxyl groups, hydroxyl groups, carboxyl groups, epoxy groups, cyano groups, halogen atoms, and so forth may be cited as examples. Of these, amino groups, alkoxyl groups, hydroxyl groups, and carboxyl groups are preferred. The modified rubber may possess at least one of the types of functional groups that were cited as examples. As amino group(s), primary amino groups, secondary amino groups, tertiary amino groups, and so forth may be cited as examples. As alkoxyl group(s), methoxy groups, ethoxy groups, propoxy groups, butoxy groups, and so forth may be cited as examples. The functional groups that were cited as examples interact with silanol groups (Si—OH) of silica. Here, "interaction" means, for example, that there is formation of a hydrogen bond or a chemical bond caused by chemical reaction with a silanol group of silica. The amount of modified rubber might be not less than 10 mass %, might be not less than 20 mass %, or might be not less than 30 mass %, per 100 mass % of the rubber used at the first step. The amount of modified rubber might be not greater than 90 mass %, might be not greater than 80 mass %, or might be not greater than 70 mass %, per 100 mass % of the rubber used at the first step.

As silica, wet silica and dry silica may be cited as examples. Of these, wet silica is preferred. As wet silica, precipitated silica may be cited as example. Specific surface area of silica as determined by nitrogen adsorption might be not less than 80 $m^2/g$, or it might be not less than 120 $m^2/g$, or it might be not less than 140 $m^2/g$, or it might be not less than 160 $m^2/g$, for example. Specific surface area of silica might be not greater than 300 $m^2/g$, or it might be not greater than 280 $m^2/g$, or it might be not greater than 260 $m^2/g$, or it might be not greater than 250 $m^2/g$, for example. Here, the specific surface area of silica is measured in accordance with the multipoint nitrogen adsorption method (BET method) described at JIS K-6430.

It is preferred at the first step that the amount of silica be not less than 10 parts by mass, more preferred that this be not less than 30 parts by mass, still more preferred that this be not less than 50 parts by mass, still more preferred that this be not less than 70 parts by mass, and still more preferred that this be not less than 80 parts by mass, per 100 parts by mass of rubber. It is preferred that the amount of silica be not greater than 150 parts by mass, more preferred that this be not greater than 140 parts by mass, still more preferred that this be not greater than 130 parts by mass, and still more preferred that this be not greater than 120 parts by mass, per 100 parts by mass of rubber.

As silane coupling agent, bis(3-triethoxysilylpropyl)tetrasulfide, bis(3-triethoxysilylpropyl)disulfide, bis(2-triethoxysilylethyl)tetrasulfide, bis(4-triekitoshisilylbutyl)disulfide, bis(3-trimethoxysilylpropyl)tetrasulfide, bis(2-trimethoxysilylethyl)disulfide, and other such sulfide silanes, γ-mercaptopropyltrimethoxysilane, γ-mercaptopropyltriethoxysilane, mercaptopropylmethyldimethoxysilane, mercaptopropyldimethylmethoxysilane, mercaptoethyltriethoxysilane, and other such mercaptosilanes, 3-octanoyl-thio-1-propyltriethoxysilane, 3-propionylthiopropyltrimethoxysilane, and other such protected mercaptosilanes may be cited as examples. One or any desired combination may be chosen from thereamong and used.

At the first step, it is preferred that the amount of silane coupling agent be not less than 1 part by mass, more preferred that this be not less than 3 parts by mass, and still more preferred that this be not less than 5 parts by mass, per 100 parts by mass of silica. The upper limit of the range in values for the amount of silane coupling agent might be 20 parts by mass, or might be 15 parts by mass, per 100 parts by mass of silica, for example.

At the first step, carbon black, antioxidant, stearic acid, wax, zinc oxide, oil, and/or the like may be kneaded together with the rubber, silica, and silane coupling agent. One or any desired combination may be chosen from thereamong and used.

As examples of carbon black, besides SAF, ISAF, HAF, FEF, GPF, and/or other such furnace blacks, acetylene black, Ketchen black, and/or other such electrically conductive carbon blacks may be used. The carbon black may be nongranulated carbon black or may be granulated carbon black that has been granulated based upon considerations related to the handling characteristics thereof. Any one thereamong may be used, or any two or more thereamong may be used.

As antioxidant, aromatic-amine-type antioxidant, amine-ketone-type antioxidant, monophenol-type antioxidant, bisphenol-type antioxidant, polyphenol-type antioxidant, dithiocarbamate-type antioxidant, thiourea-type antioxidant, and the like may be cited as examples. One or any desired combination may be chosen from thereamong and used as the antioxidant.

At the first step, kneading is carried out while ram 7 is maintained in a state in which it is at a first position which is higher than the lowermost position within the range of movement of which ram 7 is capable. Because this makes it possible to prevent materials (i.e., compounding ingredients and/or rubber) from coming to rest on top of ram 7, it makes it possible for kneading to be carried out with a high fill factor (e.g., a fill factor on substantially the same order as or higher than that which would be employed with a tangential internal kneader). Moreover, because it is possible to prevent materials (i.e., compounding ingredients and/or rubber) from coming to rest on top of ram 7, it is possible to improve the efficiency with which compounding ingredients are incorporated thereinto. In other words, it is possible to reduce BIT. As a result, because it is possible to ensure that there will be sufficient kneading time for dispersal of silica, this makes it possible to improve dispersal of silica. It will therefore be possible to improve wet braking performance and ability to achieve reduced heat generation.

Taking the volume of the space which is enclosed by ram 7 and casing 2 when ram 7 is at its lowermost position to be the first effective volume, and taking the volume of the space which is enclosed by ram 7 and casing 2 when ram 7 is at the first position to be the second effective volume, during the first step the second effective volume is not less than 105% relative to a value of 100% for the first effective volume, it being preferred that this be not less than 108% thereof, more preferred that this be not less than 110% thereof, still more preferred that this be not less than 112% thereof, and still more preferred that this be not less than 114% thereof. When this is not less than 105% thereof, because it will be possible to effectively prevent materials (i.e., compounding ingredients and/or rubber) from coming to rest on top of ram 7, it will be possible to further improve the efficiency with which compounding ingredients are incorporated thereinto. In other words, it will be possible to further reduce BIT.

During the first step, the second effective volume is not greater than 120% relative to a value of 100% for the first effective volume, it being preferred that this be not greater than 119% thereof, and more preferred that this be not greater than 118% thereof. When this is not greater than 120% thereof, because it will be possible to effectively subject the kneaded batch to shearing, it will be possible to cause increase in kneading temperature without difficulty during the first step (i.e., the step in which kneading which is accompanied by increase in kneading temperature is carried out).

Here, the first and second "effective volumes" refer to the volumes of the spaces enclosed by ram 7 and casing 2. These effective volumes are not the values obtained when the volume occupied by rotors 3 is subtracted from the volumes of the spaces enclosed by ram 7 and casing 2.

Description of the fill factor at the first step will be omitted, as it would be redundant in light of the description given above with respect to the fill factor at Operation S1. Description of fill factor at Operation S1 may therefore also be considered to serve as description of fill factor at the first step.

2.1.2. Second Step (Step in which Kneading is Carried Out so as to Suppress Occurrence of Coupling Reaction)

At the second step, kneading is carried out while kneading temperature is controlled so as to suppress occurrence of the coupling reaction (reaction between silica and silane coupling agent). This makes it possible to achieve effective dispersal of silica before the coupling reaction reaches the point where it is proceeding vigorously. As a result, it will be possible to further improve performance with respect to braking on wet road surfaces (wet braking performance) and ability to achieve reduced heat generation.

At the second step, kneading is carried out so as to cause the kneading temperature to be held constant. Where it is said that "the kneading temperature is held constant," this means that the kneading temperature is maintained within a constant range. More specifically, at the second step, kneading is carried out so as to cause measured temperature Tp to be maintained at target temperature Ts. At such time, measured temperature Tp may be maintained so as to be within ±5° C. of target temperature Ts. Target temperature Ts might be less than 140° C., or might be not greater than 138° C., or might be not greater than 135° C., or might be not greater than 132° C., or might be not greater than 130° C. It is preferred that target temperature Ts be not less than 100° C., more preferred that this be not less than 110° C., still more preferred that this be not less than 115°, and still more preferred that this be not less than 120°. Where this is too low, there is a tendency for it to take a long time for silica to be dispersed. Note that target temperature Ts may be chosen as appropriate in light of the blend employed, and especially in light of the type(s) of silane coupling agent(s) employed.

At the second step, kneading is carried out so as to cause the kneading temperature to be maintained within a constant range for not less than 10 seconds. It is preferred that this be not less than 20 seconds, more preferred that this be not less than 30 seconds, still more preferred that this be not less than 40 seconds, and still more preferred that this be not less than 50 seconds. This might be not greater than 1000 seconds, or this might be not greater than 800 seconds, or this might be not greater than 600 seconds, or this might be not greater than 400 seconds, or this might be not greater than 200 seconds, or this might be not greater than 100 seconds.

The kneading temperature is maintained by carrying out adjustment of the rotational speed of rotor 3. More specifically, the kneading temperature is maintained by virtue of the fact that the rotational speed of rotor 3 is adjusted by means of PID control. Here, the rotational speed of rotor 3 is adjusted by means of PID control so as to cause measured temperature Tp to be target temperature Ts. PID control may commence at the start of kneading, or may commence when measured temperature Tp reaches some prescribed temperature.

At the second step, kneading is carried out while ram 7 is maintained in a state in which it is at a first position which is higher than the lowermost position within the range of movement of which ram 7 is capable.

It is preferred during the second step that the second effective volume (i.e., the volume of the space which is enclosed by ram 7 and casing 2 when ram 7 is at the first position) be not less than 105% relative to a value of 100% for the first effective volume (i.e., the volume of the space which is enclosed by ram 7 and casing 2 when ram 7 is at its lowermost position), it being more preferred that this be not less than 108% thereof, still more preferred that this be not less than 110% thereof, still more preferred that this be not less than 112% thereof, and still more preferred that this be not less than 114% thereof. When this is not less than 105% thereof, this will facilitate maintenance of the kneading temperature. Description will be given with respect to this. If ram 7 were to be in its lowermost position during the second step, then because there would be much heat generated from shearing, this would tend to lead to an increase in temperature. In contradistinction thereto, because in accordance with the present embodiment the fact that the second effective volume is not less than 105% relative to a value of 100% for the first effective volume, i.e., ram 7 is at a suitable position, makes it possible to avoid a situation in which the amount of heat generated from shearing becomes too large, this facilitates maintenance of the kneading temperature at target temperature Ts.

During the second step, it is preferred that the second effective volume be not greater than 120% relative to a value of 100% for the first effective volume, more preferred that this be not greater than 119% thereof, and still more preferred that this be not greater than 118% thereof. When this is not greater than 120% thereof, it will be possible to maintain the kneading temperature without difficulty. Description will be given with respect to this. If ram 7 were to be too high during the second step, this would cause there to be too little heat generated from shearing. In contradistinction thereto, because in accordance with the present embodiment the fact that the second effective volume is not greater than 120% relative to a value of 100% for the first effective volume, i.e., ram 7 is at a suitable position, makes it possible to avoid a situation in which the amount of heat generated from shearing becomes too small, this makes it possible to maintain the kneading temperature at target temperature Ts without difficulty.

Note that there is no need for the second effective volume at the second step to be the same as the second effective volume at the first step. In other words, the second effective volume at the second step may be the same as, or may be different from, the second effective volume at the first step.

2.1.3. Third Step (Step in which Kneading Accompanied by Further Increase in Kneading Temperature is Carried Out)

At the third step, kneading which is accompanied by a further increase in kneading temperature is carried out. At the third step, the kneading temperature is increased to a temperature at which the coupling reaction proceeds vigorously (e.g., 140° C. or higher). More specifically, the kneading temperature is increased to target temperature Ts for the fourth step.

At the third step, kneading may be carried out while ram 7 is maintained in a state in which it is at the lowermost position within the range of movement of which ram 7 is capable, and/or kneading may be carried out while ram 7 is maintained in a state in which it is at a first position which is higher than the lowermost position of ram 7.

2.1.4. Fourth Step (Step in which Kneading is Carried Out so as to Cause Coupling Reaction to Proceed)

At the fourth step, kneading is carried out while kneading temperature is controlled so as to cause the coupling reaction (reaction between silica and silane coupling agent) to proceed. Because this makes it possible to cause the coupling reaction to proceed vigorously, this will make it possible to increase the efficiency with which the coupling reaction takes place, and will consequently make it possible to effectively reduce silica cohesive forces. Accordingly, because it will be possible to effectively increase dispersal of silica, it will be possible to improve wet braking performance and ability to achieve reduced heat generation in tires.

At the fourth step, kneading may be carried out while ram 7 is maintained in a state in which it is at the lowermost position within the range of movement of which ram 7 is capable, and/or kneading may be carried out while ram 7 is maintained in a state in which it is at a first position which is higher than the lowermost position of ram 7.

At the fourth step, kneading is carried out so as to cause the kneading temperature to be held constant. Where it is said that "the kneading temperature is held constant," this means that the kneading temperature is maintained within a constant range. More specifically, at the fourth step, kneading is carried out so as to cause measured temperature Tp to be maintained at target temperature Ts. At such time, measured temperature Tp may be maintained so as to be within ±5° C. of target temperature Ts. Target temperature Ts might be not less than 140° C., or might be not less than 142° C., or might be not less than 145° C., or might be not less than 148° C., or might be not less than 150° C. Where this is too low, there is a tendency for it to take too long a time for the coupling reaction to proceed. It is preferred that target temperature Ts be not greater than 170° C., more preferred that this be not greater than 165° C., still more preferred that this be not greater than 160°, still more preferred that this be not greater than 155°, and still more preferred that this be not greater than 153°. Where this is too high, it is sometimes the case that there will be gel formation.

At the fourth step, kneading is carried out so as to cause the kneading temperature to be maintained within a constant range for not less than 20 seconds. It is preferred that this be not less than 40 seconds, more preferred that this be not less than 60 seconds, still more preferred that this be not less than 80 seconds, and still more preferred that this be not less than 100 seconds. This might be not greater than 2000 seconds, or this might be not greater than 1500 seconds, or this might be not greater than 1000 seconds, or this might be not greater than 500 seconds, or this might be not greater than 300 seconds, or this might be not greater than 200 seconds.

Note that, as was the case at the second step, the kneading temperature is maintained by carrying out adjustment of the rotational speed of rotor 3.

Thereafter, where necessary, kneading may be continued to be carried out until a prescribed discharge temperature is reached, drop door 9 may be opened, and the rubber mixture may be discharged.

2.1.5. Miscellaneous

Where necessary, the rubber mixture may be subjected to further kneading for improvement of silica dispersal characteristics and/or reduction in Mooney viscosity. In other words, rekneading thereof may be carried out.

As a result of a procedure such as the foregoing, a rubber mixture may be obtained.

2.2. Operation S2 (Operation in which Rubber Mixture and Vulcanizing-Type Compounding Ingredient are Kneaded to Obtain Rubber Composition)

At Operation S2, at least the rubber mixture and a vulcanizing-type compounding ingredient are kneaded to obtain a rubber composition. As examples of the vulcanizing-type compounding ingredient, sulfur, organic peroxides, and other such vulcanizing agents, vulcanization accelerators, vulcanization accelerator activators, vulcanization retarders, and so forth may be cited. One or any desired combination may be chosen from thereamong and used as the vulcanizing-type compounding ingredient. As examples of the sulfur, powdered sulfur, precipitated sulfur, insoluble sulfur, high dispersing sulfur, and the like may be cited. One or any desired combination may be chosen from thereamong and used as the sulfur. As examples of the vulcanization accelerators, sulfenamide-type vulcanization accelerators, thiuram-type vulcanization accelerators, thiazole-type vulcanization accelerators, thiourea-type vulcanization accelerators, guanidine-type vulcanization accelerators, dithiocarbamate-type vulcanization accelerators, and so forth may be cited. One or any desired combination may be chosen from thereamong and used as the vulcanization accelerator. Kneading may be carried out using a kneader. As the kneader, internal kneaders, open roll mills, and the like may be cited as examples. As an internal kneader, intermeshing internal kneaders, tangential internal kneaders, and the like may be cited as examples.

It is preferred that the amount of silica in the rubber composition be not less than 10 parts by mass, more preferred that this be not less than 30 parts by mass, still more preferred that this be not less than 50 parts by mass, still more preferred that this be not less than 70 parts by mass, and still more preferred that this be not less than 80 parts by mass, per 100 parts by mass of rubber. It is preferred that the amount of silica be not greater than 150 parts by mass, more preferred that this be not greater than 140 parts by mass, still more preferred that this be not greater than 130 parts by mass, and still more preferred that this be not greater than 120 parts by mass, per 100 parts by mass of rubber.

It is preferred that the amount of silane coupling agent in the rubber composition be not less than 1 part by mass, more preferred that this be not less than 3 parts by mass, and still more preferred that this be not less than 5 parts by mass, per 100 parts by mass of silica. The upper limit of the range in values for the amount of silane coupling agent might be 20 parts by mass, or might be 15 parts by mass, per 100 parts by mass of silica, for example.

The rubber composition may further comprise carbon black, antioxidant, stearic acid, wax, zinc oxide, oil, sulfur, vulcanization accelerator, and/or the like. The rubber composition may comprise one or any desired combination thereamong. It is preferred that the amount of the sulfur, expressed as equivalent sulfur content, be 0.5 part by mass to 5 parts by mass for every 100 parts by mass of rubber. It is preferred that the amount of the vulcanization accelerator be 0.1 part by mass to 5 parts by mass for every 100 parts by mass of rubber.

The rubber composition may be used to fabricate a tire. More specifically, it is capable of being used in fabricating tire member(s) making up a tire. For example, the rubber composition may be used in fabricating tread rubber, sidewall rubber, chafer rubber, bead filler rubber, and/or the like. The rubber composition may be used to fabricate one or any desired combination among such tire member(s).

3. Respective Operations at Tire Manufacturing Method

Description will next be given with respect to some of the operations which are included in a method for manufacturing a tire in accordance with the present embodiment. Of these operations, note that operations for preparing a rubber composition have already been described.

A tire manufacturing method in accordance with the present embodiment comprises an operation in which a rubber composition is used to fabricate an unvulcanized tire. This operation comprises fabrication of tire member(s) which comprise a rubber composition(s), and fabrication of an unvulcanized tire which is equipped with the tire member(s). As tire member(s), tread rubber, sidewall rubber, chafer rubber, and bead filler rubber may be cited as examples. Thereamong, tread rubber is preferred.

The tire manufacturing method in accordance with the present embodiment may further comprise an operation in which the unvulcanized tire is vulcanized and molded. The tire obtained in accordance with the method of the present embodiment may be a pneumatic tire.

Various Modifications May be Made to the Foregoing Embodiment

Various modifications may be made to the foregoing embodiment. For example, modifications which may be made to the foregoing embodiment might include any one or more variations chosen from among the following.

The foregoing embodiment was described in terms of a constitution in which the total amount of silica is fed thereinto during a kneading stage which comprises the first step through the fourth step. However, the foregoing embodiment is not limited to this constitution. For example, feeding of silica thereinto may be divided among a plurality of kneading stages.

The foregoing embodiment was described in terms of a constitution in which kneading temperature is controlled at the second step (i.e., the step in which kneading is carried out so as to suppress occurrence of the coupling reaction). However, the foregoing embodiment is not limited to this constitution. For example, kneading temperature need not be controlled at the second step.

The foregoing embodiment was described in terms of a constitution in which kneading is carried out while ram 7 is maintained in a state in which it is at a first position (i.e., a position which is higher than the lowermost position within the range of movement of which ram 7 is capable) during not only the first step but also during the second step (i.e., the step in which kneading is carried out so as to suppress occurrence of the coupling reaction). However, the foregoing embodiment is not limited to this constitution.

The foregoing embodiment was described in terms of a constitution in which kneading temperature is controlled at the fourth step (i.e., the step in which kneading is carried out so as to cause the coupling reaction to proceed). However, the foregoing embodiment is not limited to this constitution. For example, kneading temperature need not be controlled at the fourth step.

The foregoing embodiment was described in terms of a constitution in which a rubber mixture and a vulcanizing-type compounding ingredient are kneaded to obtain a rubber composition. However, the foregoing embodiment is not limited to this constitution. For example, the rubber mixture may be deemed to be the rubber composition.

Working Examples

Working examples in accordance with the present invention are described below.

The raw materials and reagents that were used at the Working Examples are indicated below.

| | |
|---|---|
| SBR1 | "SBR 1502" manufactured by JSR Corporation |
| SBR2 | "SBR 1723" (oil content 37.5 mass %) manufactured by JSR Corporation |
| NR | RSS #3 |
| Carbon black | "SEAST KH" manufactured by Tokai Carbon Co., Ltd. |
| Silica | "VN3" (BET = 180 m$^2$/g) manufactured by Evonik Industries |
| Oil | "Process NC-140" manufactured by JX Nippon Oil and Energy Corporation |
| Silane coupling agent | "Si 75" manufactured by Degussa |
| Zinc oxide | "Zinc Oxide Variety No. 2" manufactured by Mitsui Mining & Smelting Co., Ltd. |
| Wax | "OZOACE 0355" manufactured by Nippon Seiro Co., Ltd. |
| Stearic acid | "Industrial Stearic Acid" manufactured by Kao Corporation |
| Sulfur | "5% Oil Treated Powdered Sulfur" manufactured by Tsurumi Chemical Industry Co., Ltd. |
| Vulcanization accelerator | "NOCCELER NS-P" manufactured by Ouchi Shinko Chemical Industrial Co., Ltd. |

At TABLE 1, below, note that values indicated for parts by mass of SBR2 are based on the net amount of rubber therein. That is, at TABLE 1, below, where a value of 30 parts by mass is indicated for SBR2, any oil that may be present is not counted toward that 30 parts by mass.

Furthermore, Si 75 is a silane coupling agent for which reaction with silica barely proceeds at all at 130° C. but for which reaction with silica proceeds at 150° C.

Preparation of Unvulcanized Rubber at Comparative Example 1

Rubber and compounding ingredients in accordance with TABLE 1 were fed into a tangential internal kneader, were kneaded without carrying out PID control, and the mixture was discharged therefrom at 160° C. During this kneading, except for when the ram was moved up and down for the purpose of cleaning, the ram was maintained in its lowermost position. The mixture and sulfur and vulcanization accelerator were kneaded to obtain unvulcanized rubber.

Preparation of Unvulcanized Rubber at Comparative Example 2

Rubber and compounding ingredients in accordance with TABLE 1 were fed into an intermeshing internal kneader, were kneaded without carrying out PID control, and the mixture was discharged therefrom at 160° C. During this kneading, except for when the ram was moved up and down for the purpose of cleaning, the ram was maintained in its lowermost position. The mixture and sulfur and vulcanization accelerator were kneaded to obtain unvulcanized rubber.

Preparation of Unvulcanized Rubber at Comparative Example 3

In accordance with TABLE 1, rubber and compounding ingredients were fed into an intermeshing internal kneader, these were kneaded while carrying out PID control in two steps, and the mixture was discharged therefrom at 160° C. That is, kneading was carried out for 60 seconds at a target temperature of 130° C. during the first step, kneading was carried out for 120 seconds at a target temperature of 150° C. during the second step, and the mixture was discharged therefrom at 160° C. During this kneading, except for when the ram was moved up and down for the purpose of cleaning, the ram was maintained in its lowermost position. The mixture and sulfur and vulcanization accelerator were kneaded to obtain unvulcanized rubber.

Preparation of Unvulcanized Rubber at Working Examples 1 and 2

In accordance with TABLE 1, rubber and compounding ingredients were fed into an intermeshing internal kneader, these were kneaded while carrying out PID control in two steps, and the mixture was discharged therefrom at 160° C. That is, kneading was carried out for 60 seconds at a target temperature of 130° C. during the first step, kneading was carried out for 120 seconds at a target temperature of 150° C. during the second step, and the mixture was discharged therefrom at 160° C. During this kneading, except for when the ram was moved up and down for the purpose of cleaning, the ram was maintained in a position which was higher than its lowermost position. In other words, during this kneading, the ram was maintained in a raised state. The mixture and sulfur and vulcanization accelerator were kneaded to obtain unvulcanized rubber.

Preparation of Unvulcanized Rubber at Working Example 3

In accordance with TABLE 1, rubber and compounding ingredients were fed into an intermeshing internal kneader, these were kneaded while carrying out PID control in two steps, and the mixture was discharged therefrom at 165° C. That is, kneading was carried out for 80 seconds at a target temperature of 120° C. during the first step, kneading was carried out for 120 seconds at a target temperature of 150° C. during the second step, and the mixture was discharged therefrom at 165° C. During this kneading, except for when the ram was moved up and down for the purpose of cleaning, the ram was maintained in a position which was higher than its lowermost position. In other words, during this kneading, the ram was maintained in a raised state. The mixture and sulfur and vulcanization accelerator were kneaded to obtain unvulcanized rubber.

Preparation of Vulcanized Rubber

The unvulcanized rubber was vulcanized for 30 minutes at 150° C. to obtain vulcanized rubber.

Black Incorporation Time (BIT)

BIT was calculated based on kneading time and torque.

Stability in Temperature During Control at First Step (i.e., First Control)

During the control which was carried out at the first step (i.e., the first control), when measured temperature Tp was maintained within ±3° C. of target temperature Ts, this was evaluated as EXCELLENT; when maintained at ±3° C. to ±5° C. thereof, this was evaluated as GOOD; and when maintained at ±5° C. to ±10° C. thereof, this was evaluated as BAD.

Quality of Unvulcanized Rubber Sheeting

A roller was used to mold the unvulcanized rubber into sheet form, which was inspected to ascertain the quality thereof. When there were neither voids at the sheet surface nor slits in the sheet, this was evaluated as GOOD; when there were voids at the sheet surface but there were no slits in the sheet, this was evaluated as FAIR; and when there were voids at the sheet surface as well as slits in the sheet, this was evaluated as BAD. The significance of this is that the closer to GOOD the more excellent the dispersion characteristics of silica within unvulcanized rubber.

Productivity

Productivity is an index that is related to the discharged amount. At TABLE 1, under the heading "Productivity," the discharged amounts at the respective Examples are shown as indexed relative to a value of 100 for the discharged amount at Comparative Example 1. The higher the index the greater the discharged amount; which is to say, the more excellent the productivity.

Ability to Achieve Reduced Fuel Consumption

A viscoelasticity testing machine manufactured by Toyo Seiki Seisaku-sho, Ltd., was used to measure tan δ of the vulcanized rubber in accordance with JIS K-6394. tan δ was measured under conditions of frequency 10 Hz, dynamic strain 1.0%, temperature 60° C., and static strain (initial strain) 10%. tan δ of the respective Examples are shown at TABLE 1 as indexed relative to a value of 100 for the tan δ obtained at Comparative Example 1. The smaller the index the lower the tan δ and the more excellent the ability to achieve reduced fuel consumption.

Wet Braking Performance

A Rüpke rebound resilience testing apparatus was used to measure rebound resilience (%) under conditions of 23° C. in accordance with JIS K6255. The reciprocals (reciprocals of rebound resiliences) for the respective Examples are shown at TABLE 1 as indexed relative to a value of 100 for the reciprocal of the rebound resilience obtained at Comparative Example 1. The higher the index the more excellent the wet braking performance.

TABLE 1

|  |  | Comparative Example 1 | Comparative Example 2 | Comparative Example 3 | Working Example 1 | Working Example 2 | Working Example 3 |
| --- | --- | --- | --- | --- | --- | --- | --- |
| Amount blended therein (parts by mass) | SBR1 | 60 | 60 | 60 | 60 | 60 | 60 |
|  | SBR2 | 30 | 30 | 30 | 30 | 30 | 30 |
|  | NR | 10 | 10 | 10 | 10 | 10 | 10 |
|  | Carbon black | 5 | 5 | 5 | 5 | 5 | 5 |
|  | Silica | 90 | 90 | 90 | 90 | 90 | 90 |
|  | Oil | 15 | 15 | 15 | 15 | 15 | 15 |
|  | Silane coupling agent | 7.2 | 7.2 | 7.2 | 7.2 | 7.2 | 7.2 |
|  | Zinc oxide | 3 | 3 | 3 | 3 | 3 | 3 |
|  | Wax | 2 | 2 | 2 | 2 | 2 | 2 |

TABLE 1-continued

|  |  | Comparative Example 1 | Comparative Example 2 | Comparative Example 3 | Working Example 1 | Working Example 2 | Working Example 3 |
|---|---|---|---|---|---|---|---|
|  | Stearic acid | 2 | 2 | 2 | 2 | 2 | 2 |
|  | Sulfur | 2 | 2 | 2 | 2 | 2 | 2 |
|  | Vulcanization accelerator | 1 | 1 | 1 | 1 | 1 | 1 |
| Kneading Conditions | First control temperature ° C. | — | — | 130 | 130 | 130 | 120 |
|  | Second control temperature ° C. | — | — | 150 | 150 | 150 | 150 |
|  | First control time seconds | — | — | 60 | 60 | 60 | 80 |
|  | Second control time seconds | — | — | 120 | 120 | 120 | 120 |
|  | Discharge temperature ° C. | 160 | 160 | 160 | 160 | 160 | 165 |
|  | Ram raised? | No | No | No | Yes | Yes | Yes |
|  | Effective volume before raise ram (first effective volume) L | 235 | 255 | 255 | 255 | 255 | 255 |
|  | Effective volume while ram raised (second effective volume) | 235 | 255 | 255 | 293 | 301 | 293 |
|  | (Effective volume while ram raised/Effective volume before raise ram) × 100% | 100 | 100 | 100 | 115 | 118 | 115 |
|  | Fill factor (F.F.) before raise ram % | 75 | 60 | 69 | 71 | 76 | 73 |
|  | Discharged amount L | 176 | 153 | 176 | 180 | 195 | 185 |
| Evaluation | Black incorporation time (BIT) seconds | 102 | 100 | 117 | 92 | 98 | 91 |
|  | Stability in temperature during first control | — | — | BAD | EXCELLENT | GOOD | EXCELLENT |
|  | Discharged sheet quality | BAD | FAIR | GOOD | GOOD | GOOD | GOOD |
|  | Productivity | 100 | 87 | 100 | 102 | 111 | 105 |
|  | Ability to achieve reduced fuel consumption | 100 | 95 | 103 | 88 | 92 | 85 |
|  | Wet braking performance | 100 | 102 | 98 | 108 | 103 | 110 |

At TABLE 1, where it is indicated that PID control was carried out in two steps, note that this refers to PID control that was initiated at the point in time when the measured temperature reached the target temperature. During this PID control, the rotational speeds of the rotor were controlled.

With regard to the fill factor employed at the time that kneading was carried out using the intermeshing internal kneader, by employing a value therefor that was smaller than the fill factor employed with the tangential internal kneader, it was possible to cause the BIT obtained when kneading was carried out using the intermeshing internal kneader to be roughly on the same order as that obtained with the tangential internal kneader (see Comparative Example 1 and Comparative Example 2).

Despite the fact that kneading was carried out using a fill factor substantially on the same order as a fill factor employed with the tangential internal kneader, it was possible by carrying out kneading with the ram in a raised state to achieve reduction in BIT (see Comparative Example 3 and Working Examples 1 to 3). In addition, carrying out kneading with the ram in a raised state permitted improvement in the quality of the unvulcanized rubber sheeting (see Comparative Example 3 and Working Examples 1 to 3). In other words, this permitted improvement in silica dispersion characteristics. What is more, carrying out kneading with the ram in a raised state permitted improvement in wet braking performance and ability to achieve reduced heat generation (see Comparative Example 3 and Working Examples 1 to 3).

EXPLANATION OF REFERENCE NUMERALS

1 . . . intermeshing internal kneader; 2 . . . casing; 2a . . . opening portion; 3 . . . rotor; 4 . . . kneading chamber; 5 . . . neck portion; 6 . . . inlet port; 7 . . . ram; 8 . . . shaft; 9 . . . drop door; 11 . . . controller; 13 . . . temperature sensor

The invention claimed is:
1. A rubber composition manufacturing method comprising an operation in which an intermeshing internal kneader equipped with a casing, at least two rotors which are capable of rotating within the casing, a neck portion which is located above the rotors, and a ram which is capable of moving vertically in a space within the neck portion is used to knead at least rubber, silica, and silane coupling agent, wherein
the operation comprises a first step in which kneading which is accompanied by increase in kneading temperature is carried out during an initial phase of the operation;
the operation comprises a second step in which, after the first step, kneading is carried out while the kneading temperature is controlled so as to suppress occurrence of a coupling reaction between the silica and the silane coupling agent, rotational speeds of the rotors being controlled by means of PID control to cause the kneading temperature to be a target temperature at the second step;
the target temperature is not less than 100° C. but less than 140° C.,
kneading is carried out during the first step while the ram is maintained in a state in which it is at a first position which is higher than a lowermost position within a range of movement of which the ram is capable; and
a volume of space which is enclosed by the ram and the casing when the ram is at the lowermost position to be a first effective volume, and a volume of space which is enclosed by the ram and the casing when the ram is at the first position to be a second effective volume, the second effective volume is 105% to 120% relative to a value of 100% for the first effective volume during the first step.

2. The rubber composition manufacturing method according to claim 1 wherein
during the second step as well, kneading is carried out while the ram is maintained in a state in which it is at the first position; and
during the second step as well, the second effective volume is 105% to 120% relative to a value of 100% for the first effective volume.

3. The rubber composition manufacturing method according to claim 1 wherein the ram is moved up and down during a transition from the first step to the second step.

4. The rubber composition manufacturing method according to claim 1 wherein the operation comprises a third step in which, after the second step, kneading which is accompanied by a further increase in kneading temperature is carried out.

5. The rubber composition manufacturing method according to claim 4 wherein the operation comprises a fourth step in which, after the third step, kneading is carried out while kneading temperature is controlled so as to cause the coupling reaction to proceed.

6. The rubber composition manufacturing method according to claim 5 wherein, at the fourth step, rotational speeds of the rotors are controlled by means of PID control to cause the kneading temperature to be a target temperature.

7. The rubber composition manufacturing method according to claim 5 wherein, at the fourth step, kneading is carried out while the ram is maintained in a state in which it is at the first position.

8. The rubber composition manufacturing method according to claim 5 wherein, from the first step to the fourth step, neither the rubber, nor the silica, nor the silane coupling agent is discharged from the intermeshing internal kneader.

9. The rubber composition manufacturing method according to claim 1 wherein, during the operation, at least the rubber, the silica, the silane coupling agent, and carbon black are kneaded.

10. The rubber composition manufacturing method according to claim 1 wherein, during the first step, the silica is present in an amount that is 10 parts per mass to 120 parts per mass per 100 parts per mass of the rubber.

11. A tire manufacturing method comprising:
an operation in which the rubber composition manufacturing method according to claim 1 is used to prepare the rubber composition; and
an operation in which the rubber composition is used to fabricate an unvulcanized tire.

12. The tire manufacturing method according to claim 11 wherein, during the operation in which the unvulcanized tire is fabricated, the unvulcanized tire which is fabricated is equipped with a tire member comprising the rubber composition.

13. The tire manufacturing method according to claim 12 wherein the tire member is tread rubber.

14. The rubber composition manufacturing method according to claim 1 wherein the target temperature is not less than 115° C. but not greater than 138° C.

15. The rubber composition manufacturing method according to claim 6 wherein the target temperature of the fourth step is not less than 145° C. but not greater than 165° C.

* * * * *